(12) United States Patent
Gould et al.

(10) Patent No.: US 7,407,707 B2
(45) Date of Patent: Aug. 5, 2008

(54) RADIATION-CURABLE COATINGS FOR METAL SUBSTRATES FROM MULTIFUNCTIONAL ACRYLATE OLIGOMERS

(75) Inventors: Michael Gould, Powell, OH (US); Thomas L. Marino, Toledo, OH (US); Alexandre Mejiritski, Bowling Green, OH (US); Dustin B. Martin, Monroe, MI (US)

(73) Assignee: Ashland Licensing and Intellectual Property LLC, Columbus, OH (US)

( * ) Notice: Subject to any disclaimer, the term of this patent is extended or adjusted under 35 U.S.C. 154(b) by 446 days.

(21) Appl. No.: 11/117,304

(22) Filed: Apr. 29, 2005

(65) Prior Publication Data

US 2005/0272830 A1 Dec. 8, 2005

Related U.S. Application Data

(60) Provisional application No. 60/567,131, filed on May 2, 2004.

(51) Int. Cl.
*B32B 27/06* (2006.01)
*C08G 2/26* (2006.01)
*C08F 2/46* (2006.01)
*C09D 133/08* (2006.01)
*C09D 133/10* (2006.01)
*C07C 69/72* (2006.01)

(52) U.S. Cl. .......... 428/418; 522/36; 522/183; 522/173; 522/178; 522/181; 522/174; 522/179; 428/500; 428/425.8; 528/220; 560/178; 560/183

(58) Field of Classification Search .......... 522/36, 522/170, 173, 181, 182, 174, 179, 183; 428/418, 428/500, 425.8; 528/220; 560/178, 183
See application file for complete search history.

(56) References Cited

U.S. PATENT DOCUMENTS

| 5,565,525 | A | 10/1996 | Morimoto et al. | |
|---|---|---|---|---|
| 5,945,489 | A | 8/1999 | Moy et al. | |
| 6,025,410 | A | 2/2000 | Moy et al. | |
| 6,300,456 | B1 * | 10/2001 | Musa | 528/44 |
| 6,307,001 | B1 * | 10/2001 | Musa | 528/44 |
| 6,472,069 | B1 * | 10/2002 | Bailey et al. | 428/417 |
| 6,521,716 | B1 * | 2/2003 | Leake | 525/421 |
| 6,699,929 | B2 * | 3/2004 | Musa et al. | 524/515 |
| 6,706,414 | B1 | 3/2004 | Dammann et al. | |
| 6,908,957 | B2 * | 6/2005 | Musa et al. | 524/210 |
| 7,208,538 | B2 * | 4/2007 | Taylor et al. | 524/397 |
| 7,232,540 | B2 * | 6/2007 | Gould et al. | 264/494 |
| 7,326,746 | B2 * | 2/2008 | Musa et al. | 524/210 |

FOREIGN PATENT DOCUMENTS

EP 0 982 237 * 3/2000

* cited by examiner

*Primary Examiner*—Susan W. Berman
(74) *Attorney, Agent, or Firm*—Connolly Bove Lodge & Hutz LLP

(57) ABSTRACT

The invention detailed herein comprises a family of radiation-curable coating formulations specifically for metal substrates. These coating formulations are based on multifunctional acrylate resins formed by the reaction of acrylate monomers and oligomers with ÿ-keto esters (e.g., acetoacetates), ÿ-diketones (e.g., 2, 4-pentanedione), ÿ-keto amides (e.g., acetoacetanilide, acetoacetamide), and/or other ÿ-dicarbonyl compounds that can participate in the Michael addition reaction. An essential novelty of these coating resins is that they will cure under standard UV-cure conditions without the addition of traditional photoinitiators. Other materials, both reactive (conventional acrylates) and non-reactive (e.g., solvents) may also be incorporated into the resin oligomers to enhance the coatings properties on metal substrates. These materials include a variety of acrylic monomers and oligomers, primary, secondary and tertiary amines, acid-functional monomers and oligomers, silicones, waxes and elastomers, among others. Coatings based on these novel multifunctional acrylate resins exhibit excellent adhesion and shrinkage control, flexibility, solvent resistance, scratch and mar resistance, impact resistance, color, and durability across a wide range of plastic materials. These coatings may be cured via chemical means, thermally, or by exposure to UV or electron beam radiation.

18 Claims, 3 Drawing Sheets

TMPTA

Benzophenone

Triethanolamine Synergist

RADIATION-CURABLE COATINGS FOR METAL SUBSTRATES FROM MULTIFUNCTIONAL ACRYLATE OLIGOMERS

This application claims priority to provisional application No. 60/567,131, filed May 2, 2004.

FIELD OF THE INVENTION

The present invention relates generally to a family of radiation-curable coatings specifically for metal substrates including substrates with metal "coatings" (e.g., "sputtered" aluminum finish over plastic or wood). The coatings may be of several functional types including primers, pigmented coatings or clear overcoats. These inventive coatings are based on multifunctional acrylate resins formed by the reaction of acrylate monomers and oligomers with β-keto esters (e.g., acetoacetates), β-diketones (e.g., 2,4-pentanedione), β-keto amides (e.g., acetoacetanilide, acetoacetamide), and/or other β-dicarbonyl compounds that can participate in Michael addition reactions. The present invention further relates to radiation-cured coatings, curable in the absence of exogenous photoinitiators.

BACKGROUND

The information provided below is not admitted to be prior art to the present invention, but is provided solely to assist the understanding of the reader.

Acrylate, methacrylate and other unsaturated monomers are widely used in coatings, adhesives, sealants, and elastomers, and may be crosslinked by ultraviolet light in the presence of photoinitiators or by peroxide-initiated free radical cure. These photoinitiators and/or peroxides are typically low molecular weight multifunctional compounds that may be volatile or readily absorbed through skin and can cause adverse health effects. Functionalized oligomeric photoinitiators may overcome some of these drawbacks; generally, polymeric photoinitiators are nonvolatile compounds, not readily absorbed through skin. However, multistep syntheses may be required, low functionality may be detrimental to reactivity and final properties, and catalyst or initiator may still be required to effect crosslinking.

The Michael addition of acetoacetate donor compounds to multifunctional acrylate receptor compounds to make crosslinked polymers has been described in the literature. For example, Mozner and Rheinberger reported the Michael addition of acetoacetates to triacrylates and tetraacrylates. (16 Macromolecular Rapid Communications 135 (1995)). The products formed were crosslinked gels. In one such reaction, depicted in FIG. 1, Mozner added one mole of trimethylol propane triacrylate (TMPTA) having 3 functional groups to one mole of polyethylene glycol (600 molecular weight) diacetoacetate (PEG600-DAA) having two functional groups. (Each acetoacetate "functional group" reacts twice, thus each mole of diacetoacetate has four reactive equivalents.) The resulting network is considered "gelled", or cured, despite the presence of unreacted acrylic functional groups. While further reaction can be promoted, this network cannot be made liquid either with heat or solvent because it is essentially crosslinked.

The reaction can be characterized by various ratios to describe the reactants: a mole ratio of TMPTA: PEG 600 DAA=1:1, a functional group ratio of the number of acrylate to acetoacetate functional groups=3:2, and a ratio of reactive equivalents=3:4

U.S. Pat. Nos. 5,945,489 and 6,025,410, to Moy et al. and assigned to the assignee of the present invention, disclose that certain soluble liquid uncrosslinked oligomers, made by one step Michael addition of β-dicarbonyl donor compounds (e.g., acetoacetates) to multifunctional acrylates, can be further crosslinked using ultraviolet light or electron beam radiation without requiring costly photoinitiators. Moreover, when precise proportions of multifunctional acrylate acceptor compounds to β-dicarbonyl donor compounds are combined in the presence of a basic catalyst, liquid oligomeric compositions result. If proportions below the ranges disclosed in the above-cited patent documents are used, crosslinked gels or solid products result. In addition, the disclosed liquid oligomer compositions can readily be applied to various substrates using conventional coating techniques such as roll or spray prior to radiation cure.

Multifunctional acrylates and methacrylates are commonly utilized in the preparation of crosslinked films, adhesives, foundry sand binders, and other composite materials. The invention disclosed herein demonstrates the advantageous use of these uncrosslinked resins alone or modified by reaction/blending with additional materials in coatings applications on a variety of metal substrates. These additional materials include a variety of acrylic monomers and oligomers, primary, secondary and tertiary amines, acid-functional monomers, silicones, elastomers, waxes, and others to modify and improve coatings performance.

Coatings for metal substrates based on the resins described above can be cured by all methods typically used to crosslink acrylic-functional materials. Cure, or crosslinking, is usually accomplished through a free radical chain mechanism, which may require any of a number of free radical-generating species such as peroxides, hydroperoxides, REDOX combinations, and other materials that decompose to form radicals, either when heated, or at ambient temperature in the presence of an amine and a transition metal promoter. Ultraviolet (UV) light or electron beam (EB) radiation are alternative means of initiating reaction by decomposing an appropriate photoinitiator to form free radicals.

The coatings described in this invention offer significant advantages over coatings based on traditional multifunctional acrylic monomers and oligomers in that they can be cured by exposure to UV radiation without the addition of a photoinitiator. Under typical UV curing conditions (~500 mJ/cm$^2$), these coatings can be effectively cured on a variety of metal substrates with little or no added photoinitiator. Traditional multifunctional acrylates and/or oligomers will not cure upon exposure to such low doses of UV radiation unless a photoinitiator, often at relatively high levels, is added to coating formulations. Traditional photoinitiators (e.g., benzophenone) can be toxic and expensive. An additional disadvantage is that photoinitiators and/or their decomposition products may contribute to film color, which can limit applicability of the coating over white and light-colored substrates.

The novel coatings disclosed here exhibit performance properties that make them very effective across a range of metal substrates. Traditionally, to modify the properties of photoinitiator-containing coating formulations one must admix additives, including reactive monomers or oligomers. Traditional additives can confer higher cost and may compromise some performance attributes. However, the specific properties of the coatings resulting from the present invention can be extensively modified merely by varying oligomer composition rather than by blending with additives. Coating films can be engineered to exhibit wide ranges of hardness, toughness, flexibility, tensile-strength, stain resistance, scratch resistance, impact resistance, solvent resistance, etc.

Almost any desired coating performance parameter can be attained by proper selection of the raw material building blocks used to make the oligomer.

Cure of conventional polyacrylate coating systems may be achieved without a UV photoinitiator. However, such systems typically require the use of an expensive, high-energy source, such as electron beam radiation, and cannot be accomplished with much cheaper UV radiation. Full cure can be realized with little or no traditional photoinitiator when the inventive oligomers are formulated into UV-curable coatings.

A coating must adequately wet out the surface of a substrate for it to adhere well to that surface. There are three principle wetting phenomena that apply to coatings: spreading, adhesional, and penetrational or immersional wetting. Spreading and adhesional wetting directly impact the application of a coating to a particular surface. Penetrational or immersional wetting impacts the application of coatings to porous surface structures and to particulate dispersions. When a coating fluid wets a surface, a second fluid, usually air, is displaced. Surface tension, both of the coating fluid and of the substrate, controls the action of wetting.

The spreading of a liquid over a solid is defined by $S_{L/S} = \gamma_{SA} - (\gamma_{LA} + \gamma_{SL})$, where, $\gamma_{SA}$ denotes the surface tension of the substrate under air, $\gamma_{LA}$ denotes the surface tension of the liquid coating under air, and $\gamma_{SL}$ denotes the interfacial tension or free energy of the substrate/liquid coating interface. A coating fluid will spread spontaneously when $S_{L/S}$ is either positive or zero. Where $S_{L/S}$ is negative, the coating will not properly wet the substrate. The resultant coating will be characterized by pinholes, fisheyes, or picture framing, and in the worst case scenario, complete de-wetting ('beading') will occur. The substrate-air surface tension cannot be controlled by the resin designer and the substrate-coating interfacial tension is assumed to be a minimum when the surface tensions of the substrate and coating fluid are nearly identical. Therefore, for best wetting, the coating surface tension should be lower than, but approximate equal to the surface energy of the substrate. Preferably, the surface tension of a coating resin should be about 3 to 10 dynes/cm less than the surface energy of the substrate.

The term adhesion refers to the attraction that molecules of one material experience towards molecules of a different material. The attraction of molecules of one material towards other molecules of the same material is cohesion. The surface tension of a liquid is a measure of its cohesion. The analogous term for a solid is surface energy. Surface tension and surface energy have the same units (dynes/cm) and surface tension is often used interchangeably to refer to the liquid or solid state.

The Lewis acid/base theory is the current state of the art in understanding adhesive phenomena. Atoms are held in larger structures called molecules by two types of bonds: ionic and covalent. Similarly molecules are held in larger structures (liquids and solids) by cohesive and adhesive forces termed intermolecular forces. Approximately twenty such forces are known, most are insignificant and may be ignored to a first approximation. The dominant forces are primarily electrostatic. The theory divides intermolecular forces into two principal groups. The various names have fine shades of meaning, but are normally used interchangeably: a) LW=Liftshitz-van der Waals≈London≈non-polar≈dispersive forces; and b) AB= (Lewis) acid/base≈polar forces. Dispersion forces are always present, but acid/base forces, which may or may not be present, contribute most to industrial adhesion.

FIG. 3 is a schematic drawing showing that clean metal surfaces are substantially covered with free OH-groups. These groups confer the potential for adhesion based on Lewis acid-base electrostatic interactions.

A need therefore exists for UV-curable metal coating resins that have surface tensions and electrostatic character appropriately compatible with the surface energy of metals in order to allow effective wetting and adhesion on those metal surfaces.

Other objects and advantages will become apparent from the following disclosure.

SUMMARY OF INVENTION

An aspect of the present invention provides coating resins that cure under standard UV-cure conditions without the addition of traditional photoinitiators.

According to an aspect, the present invention provides a UV-curable coating formulation for metal substrates. The inventive formulation comprises the resinous Michael addition product of a β-dicarbonyl compound and at least one Lewis-functional polyacrylate ester wherein said resin has a surface tension in the range of from about 25 to about 70 dynes/cm.

According to an aspect, the present invention provides a UV-curable Michael resin composition, for a metal substrate, comprising the resinous Michael addition product of a β-dicarbonyl compound and a Lewis-functional multifunctional acrylate ester wherein said resin has about 0.25 to about 4 Lewis-functional moieties per 100 molecular weight and has a surface tension lower than the metal substrate surface.

According to an aspect, the present invention provides a UV-curable Michael resin composition, for a metal substrate, comprising the resinous Michael addition product of a β-dicarbonyl compound and a multifunctional (meth)acrylate-functional metallic monomer incorporated into the Michael oligomer.

According to an aspect, the present invention provides a UV-curable Michael resin composition, for a metal substrate, comprising a resinous Michael addition product of a β-dicarbonyl compound and a Lewis-functional polyacrylate ester and a multifunctional (meth)acrylate functional metallic monomer exogenous to the Michael oligomer.

According to an aspect, the Lewis-functional polyacrylate comprises a chemical moiety selected from the group consisting of hydroxyl, epoxy, amine, acid, urethane, melamine, ether, ester and mixtures thereof. According to a further aspect, the Lewis-functional moieties are present from about 0.25 to about 4 moieties per 100 molecular weight.

According to an aspect, the β-dicarbonyl compound is selected from the group consisting of β-keto esters, β-diketones, β-keto amides, β-keto anilides, and mixtures thereof. According to a further aspect, a preferred β-dicarbonyl compound is selected from the group consisting of methyl acetoacetate, ethyl acetoacetate, 2-(methoxyethyl) acetoacetate, glycidyl acetoacetate, acetoacetanilide, 2,4-pentanedione, and mixtures thereof.

According to an aspect, a preferred multifunctional acrylate is selected from the group consisting of trimethylolpropane triacrylate, di-trimethylolpropane triacrylate, dipropylene glycol diacrylate, hexanediol diacrylate, pentaerythritol triacrylate, pentaerythritol tetraacrylate, isocyanurate triacrylate, bisphenol A epoxy diacrylates, epoxy novolac polyacrylates, urethane diacrylates, polyester polyacrylates, metallic (meth)acrylates, and mixtures thereof.

According to a further aspect, the inventive UV-curable Michael resin composition, further comprises at least one reactive monomer.

According to a further aspect, the inventive UV-curable Michael resin composition, further comprises at least one agent selected from the group consisting of flow and leveling additives, wetting agents, deaerating agents, photoinitiators, matting agents, colloidal silica, pigments, dyes, adhesion promoters and mixtures thereof. A further aspect provides compositions comprising the inventive resins blended with agents to impart toughness, scuff and mar resistance, and color.

According to an aspect, the present invention provides a method of using the inventive UV-curable coating composition, the method comprising providing a metal substrate, providing the inventive UV-curable coating composition, applying the composition to the substrate, and curing said substrate.

An aspect of the present invention provides substrates coated with a Michael resin of the present invention. A further aspect provides a device loaded with the inventive resin composition.

BRIEF DESCRIPTION OF DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

It is to be noted, however, that the appended drawings illustrate only typical embodiments of this invention and are therefore not to be considered limiting of its scope, for the invention may admit to other equally effective embodiments.

DETAILED DESCRIPTION OF A PREFERRED EMBODIMENT

Reference is made to the figures to illustrate selected embodiments and preferred modes of carrying out the invention. It is to be understood that the invention is not hereby limited to those aspects depicted in the figures.

The term monomer is herein defined as a molecule or compound, usually containing carbon and of relatively low molecular weight and simple structure, which is capable of conversion to oligomers, polymers, synthetic resins, or elastomers by combination with other similar and/or dissimilar molecules or compounds. For lexicographical convenience, the present disclosure uses "polyacrylate", "polyacrylate ester" and "multifunctional acrylate" as equivalent and interchangeable terms.

The term oligomer is herein defined as a low molecular weight polymer molecule consisting of only a few similar and/or dissimilar monomers at a low degree of polymerization.

Figure 1:
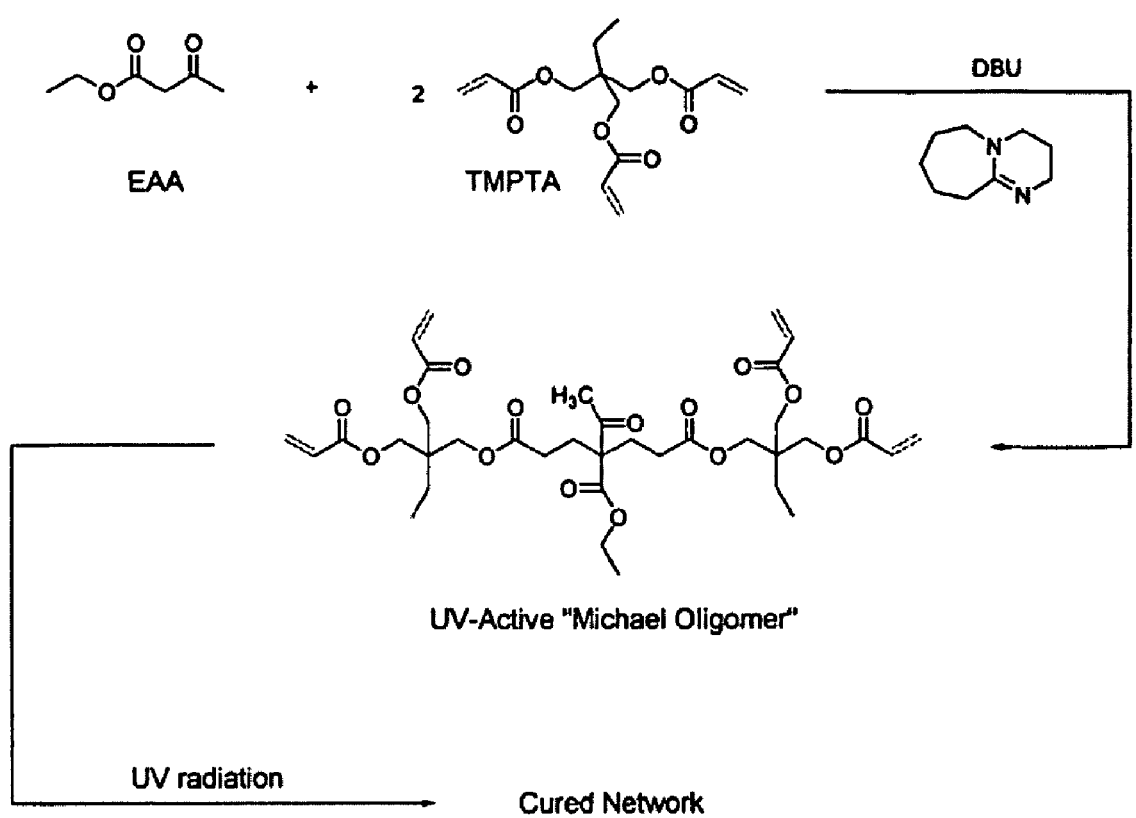
FIG. 1 is a schematic of Michael resin synthesis at a 2:1 (acrylate:acetoacetate) functional ratio.

The term resin is herein defined as an oligomer, which is capable of conversion to high molecular weight polymers by combination with other similar and/or dissimilar molecules or compounds. FIG. 1 depicts the synthesis of a model Michael oligomer of the present invention. An "oligomer" of the present invention may be compared with a "resin" of a classical coating. For lexicographical convenience, the present disclosure uses "Michael resin," "Michael addition product," and "Michael oligomer" as equivalent and interchangeable terms.

The term (meth)acrylate refers to the acrylate and/or methacrylate ester group.

Figure 2:
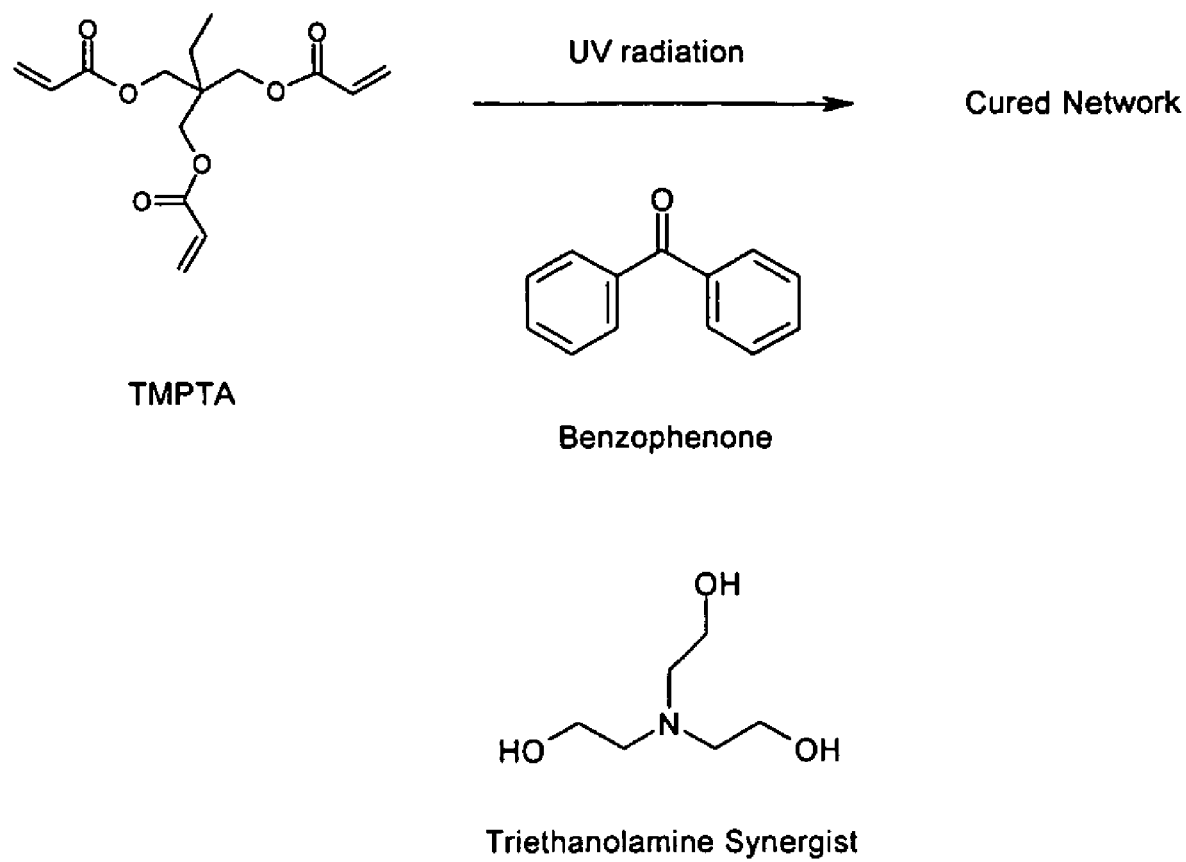
FIG. 2 is a comparative example showing trimethylol propane triacrylate (TMPTA) reacted with a photoinitiator, benzophenone, in the presence of a synergist, triethanolamine.
Figure 3:
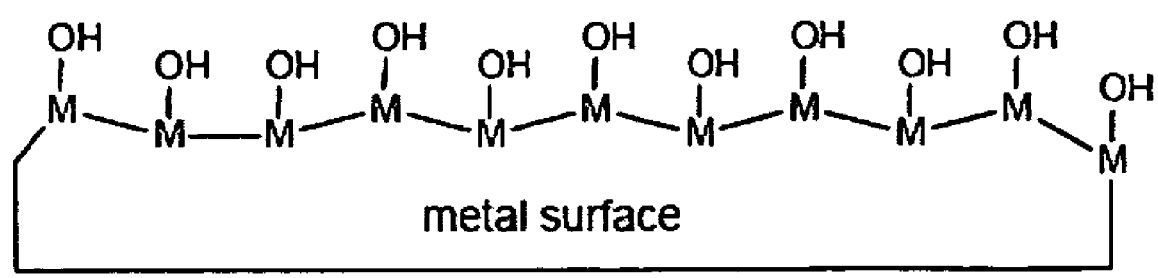
FIG. 3 is a schematic drawing of a metal surface with free OH-groups.

In a comparative example (FIG. 2), trimethylol propane triacrylate (TMPTA) is combined with a photoinitiator, benzophenone, and triethanolamine is added as a synergist in the kinetic chain to improve the efficiency of polymerization. The mixture cures to a brittle, highly-crosslinked film upon exposure to UV radiation. Modification of the properties in this example requires addition of supplementary acrylate constituents. However, even with these added acrylate constituents, relatively high levels of traditional photoinitiators are still required to cure with UV radiation. This is representative of the currently practiced art in principle. In all cases where the energy source for curing is UV, a photoinitiator is required.

As applied to radiation-curable resins and coating compositions, the term "UV" is intended, generally, to include the various types of actinic radiation used to cure such resins such as broad spectrum UV/visible, ultraviolet (UV), and electron beam (EB) radiation.

FIG. 1 depicts a model Michael oligomer of the present invention, showing the reaction of a the multifunctional (f=3) Michael acceptor, trimethylol propane triacrylate (TMPTA), reacted in a 2:1 molar ratio with a β-ketoester Michael donor, ethyl acetoacetate (EAA), in the presence of a base catalyst, 1,8-diazabicyclo[5.4.0]undec-7-ene (DBU). The resulting four-functional (f=4) polyacrylate Michael oligomer has dual chemical functionality. That is, it has both acrylic functionality and has a labile ketone group that is capable of dissociating to initiate free radical polymerization of the oligomer upon exposure to UV radiation. Film properties can be modified in a number of ways including use of additional or supplementary acrylate materials, substituting EAA with any number of different β-dicarbonyl compounds, or simply varying the stoichiometry of the reactants as shown. In a variety of ways, films can be made softer and more flexible than in FIG. 1, with less shrinkage and significantly better adhesion to a variety of metal substrates. Coatings based on these novel multifunctional acrylate resins exhibit excellent adhesion and shrinkage control, flexibility, solvent resistance, scratch and mar resistance, color, impact resistance and durability across a wide range of metallic substrates. These coatings may be cured via chemical means, thermally, or by exposure to UV or electron beam radiation.

The β-dicarbonyl Michael donor is suitably chosen from among β-keto esters, β-diketones, β-ketoamides, and β-ketoanilides. The multifunctional acrylate Michael acceptor is suitably chosen from among metallic (meth)acrylates, diacrylates, triacrylates, tetraacrylates, and higher-order acrylates. The range of β-dicarbonyl donors and multifunctional acrylate acceptors affords the composition designer the opportunity to exercise a great range of selectivity in the properties of the final product.

Metallic (Meth)Acrylates. (Meth)acrylate-functional metallic monomers are the reactive metal salts of ethylenically unsaturated carboxylic acids, represented by the general structure I:

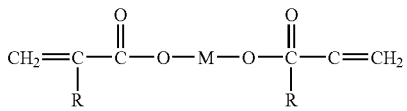

Where R=H (acrylate) or CH$_3$ (methacrylate) and M is a metal such as, but not limited to Zn or Ca. (Meth)acrylate-functional metallic monomers, when incorporated into the Michael oligomer or polymerized into the final coating, provide significant improvement in adhesion to metals. A preferred embodiment of the present invention provides a (meth) acrylate-functional metallic monomer incorporated into the Michael oligomer. An alternative preferred embodiment provides a (meth)acrylate-functional metallic monomer incorporated into the composition for incorporation into the polymerized coating. An embodiment provides a (meth)acrylate functional metallic monomer incorporated into the Michael oligomer and present in the composition as a free monomer to be polymerized into the resin.

Preferred diacrylates include, but are not limited to: ethylene glycol diacrylate, propylene glycol diacrylate, diethylene glycol diacrylate, dipropylene glycol diacrylate, triethylene glycol diacrylate, tripropylene glycol diacrylate, polyethylene glycol diacrylate, polypropylene glycol diacrylate, ethoxylated bisphenol A diacrylate, bisphenol A diglycidyl ether diacrylate, resorcinol diglycidyl ether diacrylate, 1,3-propanediol diacrylate, 1,4-butanediol diacrylate, 1,5-pentanediol diacrylate, 1,6-hexanediol diacrylate, neopentyl glycol diacrylate, cyclohexane dimethanol diacrylate, ethoxylated neopentyl glycol diacrylate, propoxylated neopentyl glycol diacrylate, ethoxylated cyclohexanedimethanol diacrylate, propoxylated cyclohexanedimethanol diacrylate, aryl urethane diacrylate, aliphatic urethane diacrylate, polyester diacrylate, and mixtures thereof.

Preferred triacrylates include, but are not limited to: trimethylol propane triacrylate, isocyanurate triacrylate, glycerol triacrylate, ethoxylated trimethylolpropane triacrylate, propoxylated trimethylolpropane triacrylate, tris (2-hydroxyethyl) isocyanurate triacrylate, ethoxylated glycerol triacrylate, propoxylated glycerol triacrylate, pentaerythritol triacrylate, aryl urethane triacrylates, aliphatic urethane triacrylates, melamine triacrylates, epoxy novolac triacrylates, aliphatic epoxy triacrylate, polyester triacrylate, and mixtures thereof.

Preferred tetraacrylates include, but are not limited to: pentaerythritol tetraacrylate, ethoxylated pentaerythritol tetraacrylate, propoxylated pentaerythritol tetraacrylate, dipentaerythritol tetraacrylate, ethoxylated dipentaerythritol tetraacrylate, propoxylated dipentaerythritol tetraacrylate, aryl urethane tetraacrylates, aliphatic urethane tetraacrylates, melamine tetraacrylates, epoxy novolac tetraacrylates, polyester tetraacrylates and mixtures thereof.

In an embodiment, the β-dicarbonyl Michael donor is a β-diketone (e.g., 2,4-pentanedione). In a preferred embodiment, the present invention is practiced with a β-ketoester (e.g., ethyl acetoacetate). The present invention is also suitably practiced with a β-ketoanilide (e.g., acetoacetanilide) or a β-ketoamide (e.g., acetoacetamide) or a mixture of Michael donors according to the desired resin quality and end use. In preferred embodiments of the present invention, the β-dicarbonyl has functionality (N) wherein N=2. β-dicarbonyl donors of higher functionality (i.e., N=2, 4, 6 . . . ) are suitable, but more careful control of reaction stoichiometry must be exercised to avoid unwanted system gellation.

Suitable β-dicarbonyl donor compounds having functionality=2 include, but are not limited to: ethyl acetoacetate, methyl acetoacetate, 2-ethylhexyl acetoacetate, lauryl acetoacetate, t-butyl acetoacetate, acetoacetanilide, N-alkyl acetoacetanilide, acetoacetamide, 2-acetoacetoxyethyl acrylate, 2-acetoacetoxyethyl methacrylate, allyl acetoacetate, benzyl acetoacetate, 2,4-pentanedione, 2,4-hexanedione, 3,5-heptanedione, isobutyl acetoacetate, glycidyl acetoacetate and 2-methoxyethyl acetoacetate.

Suitable β-dicarbonyl donor compounds having functionality=4 include, but are not limited to: 1,4-butanediol diacetoacetate, 1,6-hexanediol diacetoacetate, neopentyl glycol diacetoacetate, cyclohexane dimethanol diacetoacetate, and ethoxylated bisphenol A diacetoacetate.

Suitable β-dicarbonyl donor compounds having functionality=6 include, but are not limited to: trimethylol propane triacetoacetate, glycerol triacetoacetate, and polycaprolactone triacetoacetates.

A preferred, but not limiting, β-dicarbonyl donor compound having functionality=8, is pentaerythritol tetraacetoacetate.

The Michael addition reaction is catalyzed by a strong base. A preferred base is diazabicycloundecene (DBU), which is sufficiently strong and is readily soluble in the monomer mixtures. Other cyclic amidines, for example diazabicyclononene (DBN) and guanidines, for example, 1,1,3,3-tetramethyl guanidine, are also suitable for catalyzing this addition reaction. Group I alkoxide bases such as potassium tert-butoxide, provided they have sufficient solubility in the reaction medium, are typically adequate to promote the desired reaction. Quaternary hydroxides and alkoxides, such as tetrabutyl ammonium hydroxide or benzyltrimethyl ammonium methoxide, comprise another class of preferred base catalysts to promote the Michael addition reaction. Finally, strong, organophilic alkoxide bases can be generated in situ from the reaction between a halide anion (e.g., quaternary halide) and an epoxide moiety. Such in situ catalysts are disclosed in U.S. Pat. No. 6,706,414, assigned to Ashland, Inc., the assignee of the present application.

Michael addition of a methacrylate-functional β-dicarbonyl compound, e.g., 2-acetoacetoxyethyl methacrylate (AAEM), to a diacrylate monomer yields liquid polyacrylates with reactive pendant methacrylate groups, which can be crosslinked in a subsequent curing reaction. As the acrylate and acetoacetate are mutually reactive and the methacrylate is essentially inert under the conditions of the desired Michael addition reaction, a highly functionalized (one methacrylate per repeat unit), liquid uncrosslinked oligomer can be obtained in a one-step, solventless reaction.

The present invention confers an advantage in not requiring a solvent. However, the high selectivity of the Michael reaction permits the use of monomers such as styrene and methyl methacrylate as inert solvents to give low-viscosity systems that are easily incorporated by copolymerization into a variety of laminating resins. Suitable, non-limiting, non-reactive solvents include styrene, t-butyl styrene, α-methyl styrene, vinyl toluene, vinyl acetate, allyl acetate, allyl methacrylate, diallyl phthalate, $C_1$-$C_{18}$-methacrylate esters, dimethacrylates, and trimethacrylates.

The present invention provides a resin having residual pendant unsaturated acrylate groups. Residual pendant unsaturation means that polymerizable acrylic groups are retained by means of careful control of reactant stoichiometry. That is, there are more acrylic groups than reactive sites on the Michael donor. The nature of that addition reaction leaves pendant (versus present as part of the "backbone" of the structure where it is attached on two sides) acrylic groups away from the site of the Michael addition. Those acrylic groups are available for free radical polymerization, further Michael addition crosslinking or "pseudo Michael addition" reactions, e.g., with amines, or thiol-ene additions with mercaptans after UV exposure.

A preferred embodiment of the inventive UV-curable coating composition comprises a Lewis-functionalized Michael resin.

There often exists a significant mismatch in the respective coefficient of thermal expansion (CTE) between metal substrates and polymer adhesives or coatings applied to metal. In many cases, especially where the application is subject to thermal excursions, mismatches in CTE can result in adhesive failure and/or delamination of the coating. Silica fillers have been used to modify the CTE of epoxy-based adhesives thereby substantially reducing adhesive failure. An embodiment of the present invention provides a resin composition that includes silica powder. In a preferred embodiment, 5-10 mm silica power is incorporated in the composition to moderate the CTE mismatch.

The present invention provides UV-curing, photoinitiator-free formulations specifically adapted to metal substrates. An aspect of the present invention provides the incorporation of reactive (conventional multifunctional acrylates) and non-reactive (e.g., solvents) components into the formulations to enhance the coatings properties on metal substrates. These additives include a variety of acrylic monomers and oligomers, primary, secondary, and tertiary amines, acid-functional monomers and oligomers, silicones, waxes and elastomers, among others.

Systems comprised of traditional monomers and oligomers often have compatibility issues with some of the above additives, making for less formulating options. However, formulations built from the novel photo-curable oligomer resins described herein can incorporate a nearly unlimited variety of additives due to the chemical/architectural control possible in their synthesis. Thus, many more options are available to the formulator who must address specific challenges (e.g., adhesion, flexibility, color, etc.) for each particular metal substrate.

The coating formulations described in the following examples can be "reduced" with common solvents, for spray application to substrates, or applied at 100% solids by any means consistent with the shape and constitution of the substrate article.

Solvent Resistance. Solvent resistance is the ability of a coating to resist solvent attack or film deformity. Rubbing the coating with a cloth saturated with an appropriate solvent is one way to assess when a specific level of solvent resistance is achieved. All rubbing tests were conducted using methyl ethyl ketone (MEK) and employed a double rub technique, one complete forward and backward motion over the coated surface. To normalize test strokes, cheesecloth was fixed to the round end of a 16-oz. ball peen hammer. The double rub technique utilizes the weight of the hammer as the operator holds the hammer at the base of the handle. This test was performed until the double rubbing action cut into the film or a noticeable film disorder was evident. The method is modified from the procedure of ASTM D5402.

Adhesion testing was performed by the crosshatch method on metal substrates using a modified method of ASTM D3359 by Test Tape Method B, using a Gardco Blade PA-2054 (11-tooth, 1.5 mm cutter) Test Tape used was Permacel #99. The ASTM test reports values from 0B to 5B, with 0B being a total failure, and 5B characterizing excellent adhesion. The test reports values OB to 5B; OB being a total failure and 5B comprises excellent adhesion. The test protocol employed two grades of tape: 1) "standard" and 2) 3M 600 ("aggressive").

Sward hardness was measured by the protocol of ASTM D2134.

EXAMPLES

The following examples illustrate the constitution, application, cure and performance properties of coatings detailed in this disclosure. Examples, segregated by substrate type, were all compiled by a similar process.

The goal of this comparative exercise was to replace oligomeric resins comprising the body of the published coating formulation with Michael addition resins where practical, quantify the degree of photoinitiator reduction benefit realized by this substitution, and verify that other measured coating properties remain intact. A secondary objective was to substitute oligomers of similar composition to create formulations with viscosity as close to the benchmark formulations as possible. In some cases, formulation viscosity is significantly higher, but deemed to be within a workable window for application to the experimental substrate.

Both standard and experimental formulations were tested by measuring dose to tack-free cure with either a 300 W/in. or 600 W/in. Fusion "H" bulb as indicated in each example. All exposures were measured with an IL393 "Light Bug" (International Light), inclusive of UVA and UVB wavelengths from 250 to 400 nm. Minimum dose to achieve a "5" cure (tack-free/mar-free) on a qualitative 1-5 scale is recorded in each formulation table. Mar was determined by firmly rubbing the surface of the freshly-cured coating with a cotton swab. Coatings were then tested for adhesion, solvent resistance, and gloss or hardness, where applicable.

Michael addition and standard formulations for metal were run with photoinitiator, where indicated. Benzophenone (2.5 phr) and Irgacure* 184 (5.0 phr) or fractions of this blend were utilized as indicated in Table 1:

TABLE 1

Photoinitiator Packages

| Initiator package | Ingredient (parts w/w) | |
|---|---|---|
| Standard | Benzophenone | 2.5 |
| | Irgacure 184 | 5.0 |
| ½ PI | Benzophenone | 1.25 |
| | Irgacure 184 | 2.5 |

Table 2 describes the oligomers employed and summarizes their viscosities and minimum dose to cure tack-free/mar-free. These are strictly oligomers and not formulated coatings, per se, although in some cases they may be used "as is" without formulation additives.

TABLE 2

Summary of Experimental Oligomers

| Resin # | Resin Description | Viscosity*, 25° C. (Poise) | Minimum Dose (mJ/cm$^2$) to Cure** |
|---|---|---|---|
| 6796-126 | Acrylate oligomer | 388.5 (50° C.) | 500 |
| 6917-162 | Epoxy acrylate oligomer | 8.43 | 390 |
| 6917-144 | Aliphatic urethane acrylate oligomer | 133.2 | 680 |
| 7037-102 | Polyester acrylate oligomer | 18.0 | 1070 |

TABLE 2-continued

Summary of Experimental Oligomers

| Resin # | Resin Description | Viscosity*, 25° C. (Poise) | Minimum Dose (mJ/cm$^2$) to Cure** |
|---|---|---|---|
| 7037-107 | Modified epoxy acrylate oligomer | 39.4 | 285 |
| 6917-163 | Modified epoxy acrylate oligomer | 7.41 | 340 |
| 6917-173 | Acrylate oligomer | 616 | 790 |
| 7008-058G | Modified epoxy acrylate oligomer | 26.9 | 220 |
| 6675-093B | Acid-functional acrylic half ester oligomer | 65.1 | N/A |

*Measured on a Brookfield CAP 2000 viscometer
**300 W/in. Fusion "H" bulb

Resin 6917-163 was used for three benchmark resin components as shown since it is primarily aliphatic and monomer-based and contains some epoxy acrylate resin, the combination of which is similar to the three oligomer resins it replaces. Resin 6675-93B is utilized as an adhesion promoter so it was used to replace one of the adhesion promoting resins in the benchmark. Viscosities for the experimental formulations are higher than the control but considered acceptable.

Test substrates included untreated steel, aluminum and tinplate steel panels. Coatings were applied using a zero draw down bar with coating thicknesses ranging from about 10-16 microns.

Example 1

UV-Curable Coating Formulations for Metal Substrates

The benchmark formulation ("Metal Standard") was found in the Sartomer publication, "Chemical Resistant UV-Curable Coatings for Steel", and is accurately representative of the current state of the art. Table 3, below, is a summary of both formulation details for the benchmark and inventive compositions and their respective viscosity and cure response.

Formulation Table 3.

| Component (all quantities in phr) | "Metal standard" | 163 | 93B/163 |
|---|---|---|---|
| CN 704 (acrylated polyester adhesion promoter) | 15 | 15 | — |
| CN 132 (diacrylate oligomer) | 30 | | |
| CN 104 (epoxy diacrylate) | 5 | | |
| SR 9003 (propoxylated neopentyl glycol diacrylate) | 35 | | |
| CD 9051 (trifunctional adhesion promoter) | 7 | 7 | 7 |
| 6917-163 (epoxy acrylate oligomer) | — | 70 | 70 |
| 6675-93B (acid functional acrylic half ester oligomer) | — | — | 15 |
| Tego Rad 2200 (flow/wetting agent) | 0.5 | 0.5 | 0.5 |
| Viscosity, cP | 700 | 1900 | 1600 |
| Dose to Cure, mJ/cm$^2$ (300 W/in. "H" bulb) | | | |
| Minimum dose to cure with standard PI | 285 | | |
| Minimum dose to cure with ½ PI | 670 | 440 | 390 |
| Reduction in energy to cure at ½ photoinitiator (vs. Metal standard at ½ PI) | | 34% | 42% |

Michael oligomer formulations with ½ PI cured at lower doses than the control with ½ PI loading. The 163-based experimental formulation cured at ~440 mJ/cm$^2$ versus ~670 mJ/cm$^2$ for the control, comprising a 34% decrease in required energy to cure. Adding 6675-93B to replace the major adhesion promoter component in the 163 formulation further lowered the cure dose required for tack-free cure to 390 mJ/cm$^2$, resulting in a 42% decrease in energy needed.

All test formulations for steel containing the various Michael addition oligomers, when cured tack-free, passed MEK double rubs (>200) and nail scratch. Cured panels had very high gloss. Sward hardness was higher for the experimental systems (9) than for the benchmark (8).

TABLE 4

Adhesion of Test Systems to Untreated Steel

| | Tape Adhesion | | | |
|---|---|---|---|---|
| | Direct | | X-hatch | |
| Formulation | Std | 600 | Std | 600 |
| Metal Control | 5B | 5B | 4B, 5B | 1B, 4B |
| Metal Control - ½ PI | 5B | 5B | 5B, 4B | 1B, 1B |
| 163 - ½ PI | 5B | 5B | 4B, 4B | 1B, 0B |
| 93B/163 - ½ PI | 5B | 5B | 5B, 4B | 1B, 0B |

In terms of adhesion on steel panels (Table 4), the metal control and the Michael oligomer formulations performed equally regardless of photoinitiator level. Direct adhesion using either Permacel 99 or 3M 600 tape was excellent for both the metal control and the Michael formulations with all showing 5B. Crosshatch adhesion (duplicate evaluations) for Permacel 99 tape was nearly as good exhibiting 4B-5B performance. Crosshatch adhesion for the more aggressive 3M 600 tape was poor for all formulations.

Example 2

UV-Curable Coating Formulation Assessment on Aluminum Panels

Performance across the range of dependent variables was again equivalent to the benchmark on aluminum. All test formulations for aluminum containing the various Michael addition oligomers, when cured tack-free, passed MEK double rubs (>200) and nail scratch. Cured panels had very high gloss. Sward hardness was higher for the experimental systems (9) than for the benchmark (8).

TABLE 5

Adhesion of Test Systems to Untreated Aluminum

| | Tape Adhesion | | | |
| --- | --- | --- | --- | --- |
| | Direct | | X-hatch | |
| Formulation | Std | 600 | Std | 600 |
| Metal Control | 5B | 5B | 4B, 3B | 1B, 0B |
| Metal Control - ½ PI | 5B | 5B | 4B, 3B | 2B, 0B |
| 163 - ½ PI | 5B | 5B | 4B. 4B | 1B, 1B |
| 93B/163 - ½ PI | 5B | 5B | 5B, 3B | 0B, 0B |

On aluminum panels, the metal control and the Michael oligomer formulations performed equally, again, regardless of photoinitiator level. Direct adhesion with both Permacel 99 and 3M 600 tape was excellent for all the formulations. Cross-hatch adhesion was good for Permacel 99 tape while it was poor for 3M 600 tape.

Example 3

UV-Curable Coating Formulation Assessment on Tinplate Steel Panels

Performance across the range of dependent variables on tinplate steel was again equivalent to the benchmark system. All test formulations for tinplate containing the various Michael addition oligomers, when cured tack-free, passed MEK double rubs (>200) and nail scratch. Cured panels had very high gloss. Sward hardness was again higher for the experimental systems (9) than for the benchmark (8).

TABLE 6

Adhesion of Test Systems to Tinplate Steel

| | Tape Adhesion | | | |
| --- | --- | --- | --- | --- |
| | Direct | | X-hatch | |
| Formulation | Std | 600 | Std | 600 |
| Metal Control | 5B | 5B | 0B, 0B | 0B, 0B |
| Metal Control - ½ PI | 5B | 5B | 0B, 0B | 0B, 0B |
| 163 - ½ PI | 5B | 5B | 0B, 0B | 0B, 0B |
| 93B/163 - ½ PI | 5B | 5B | 0B, 0B | 0B, 0B |

In Example 3, adhesion test performance of the two cured inventive formulations, B and C, was identical to that of the comparative "standard" (Table 6). Again, however, the inventive formulations based on oligomers 6917-163 (B) and 6675-093B (C) delivered tack-free cure at 440 and 390 mJ/cm$^2$, respectively, with ½ the photoinitiator loading of the comparative standard. The benchmark standard required a dose of 670 mJ/cm$^2$ to achieve tack-free/mar-free cure. This represents a reduction of >35% in energy required to cure for the inventive compositions versus the benchmark.

Table 3 sets forth the dynamic viscosity of each inventive oligomer formulation as determined with a Brookfield CAP 2000 cone and plate viscometer. The viscosity was deemed acceptable so long as the formulation could be applied by standard "roller coating" equipment. Coating thickness ranged from 6 to 10 microns.

INCORPORATION BY REFERENCE

All publications, patents, patent application publications, and ASTM test method publications cited in this specification are herein incorporated by reference, and for any and all purposes, as if each individual publication, patent, patent application publication, and/or ASTM test method publication were specifically and individually indicated to be incorporated by reference. In the case of inconsistencies the present disclosure will prevail. Specifically co-pending applications Ser. Nos. 10/722,478; 10/834,176 and 11/160,597 and U.S. Pat.Nos. 7,169,825; 7,041,749; 7,317,061; 7,291,658; 7,232,540 and 7,214,725 are hereby incorporated by reference for any and all purposes.

Having thus described our invention, what we claim as new, and desire to secure by Letters Patent is:

1. A UV-curable Michael resin comprising the resinous Michael addition product of a β-dicarbonyl compound and a multifunctional (meth)acrylate metallic monomer.

2. The UV-curable Michael resin, according to claim 1, wherein said β-dicarbonyl compound is selected from the group consisting of β-keto esters, β-diketones, β-keto amides, β-keto anilides, and mixtures thereof.

3. The UV-curable Michael resin, according to claim 1, the β-dicarbonyl compound is selected from the group consisting of methyl acetoacetate, ethyl acetoacetate, 2-(methoxyethyl) acetoacetate, glycidyl acetoacetate, acetoacetanilide, 2, 4-pentanedione, and mixtures thereof.

4. The UV-curable Michael resin, according to claim 1, further comprising at least one agent selected from the group consisting of flow and leveling additives, wetting agents, deaerating agents, photoinitiators, matting agents, colloidal silica, pigments, dyes, adhesion promoters, and mixtures thereof.

5. A substrate coated with the UV-curable Michael resin according to claim 1.

6. A UV-curable Michael resin comprising:
   a resinous Michael addition product of a β-dicarbonyl compound, a Lewis-functional polyacrylate ester; and
   a multifunctional (meth)acrylate metallic monomer.

7. The UV-curable Michael resin, according to claim 6, wherein said Lewis-functional polyacrylate ester comprises a chemical moiety selected from the group consisting of hydroxyl, epoxy, amine, acid, urethane, melamine, ether, ester and mixtures thereof.

8. The UV-curable Michael resin according to claim 6, wherein the Lewis-functional polyacrylate ester is selected from the group consisting of trimethylolpropane triacrylate, di-trimethylolpropane triacrylate, dipropylene glycol diacrylate, hexanediol diacrylate, pentaerythritol triacrylate, pentaerythritol tetraacrylate, trifunctional acrylic s-triazine, bisphenol A epoxy diacrylates, epoxy novolac polyacrylates, urethane diacrylates, polyester polyacrylates, polyether polyacrylates, and mixtures thereof.

9. The UV-curable Michael resin, according to claim 6, wherein said β-dicarbonyl compound is selected from the group consisting of β-keto esters, β-diketones, β-keto amides, β-keto anilides, and mixtures thereof.

10. The UV-curable Michael resin composition, according to claim 6, the β-dicarbonyl compound is selected from the group consisting of methyl acetoacetate, ethyl acetoacetate, 2-(methoxyethyl) acetoacetate, glycidyl acetoacetate, acetoacetanilide, 2, 4-pentanedione, and mixtures thereof.

11. The UV-curable Michael resin, according to claim 6, further comprising at least one agent selected from the group consisting of flow and leveling additives, wetting agents, deaerating agents, photoinitiators, matting agents, colloidal silica, pigments, dyes, adhesion promoters, and mixtures thereof.

12. A substrate coated with the UV-curable Michael resin according to claim 6.

13. A method of using a UV-curable Michael resin comprising:
    providing a resin composition comprising the resinous Michael addition product of a β-dicarbonyl compound and a multifunctional (meth)acrylate metallic monomer
    providing a substrate;
    applying said composition to said substrate; and curing said composition.

14. The method of using a UV-curable Michael resin according to claim 13, wherein said composition further comprises at least one agent selected from the group consisting of reactive diluent monomers, adhesion promoting monomers, flow and leveling additives, wetting agents, deaerating agents, photoinitiators, matting agents, colloidal silica, pigments, dyes, adhesion promoters, and mixtures thereof.

15. The method of using a UV-curable Michael resin according to claim 13, wherein applying said composition comprises a method selected from the group consisting of roll coating, spraying, brushing, and dip-coating.

16. A method of using a UV-curable Michael resin comprising:
    a resinous Michael addition product of a β-dicarbonyl compound, a Lewis-functional polyacrylate ester; and
    a multifunctional (meth)acrylate metallic monomer
    providing a substrate;
    applying said composition to said substrate; and curing said composition.

17. The method of using a UV-curable Michael resin according to claim 16, wherein said composition further comprises at least one agent selected from the group consisting of reactive diluent monomers, adhesion promoting monomers, flow and leveling additives, wetting agents, deaerating agents, photoinitiators, matting agents, colloidal silica, pigments, dyes, adhesion promoters, and mixtures thereof.

18. The method of using a UV-curable Michael resin according to claim 16, wherein applying said composition comprises a method selected from the group consisting of roll coating, spraying, brushing, and dip-coating.

* * * * *

UNITED STATES PATENT AND TRADEMARK OFFICE
CERTIFICATE OF CORRECTION

| | |
|---|---|
| PATENT NO. | : 7,407,707 B2 |
| APPLICATION NO. | : 11/117304 |
| DATED | : August 5, 2008 |
| INVENTOR(S) | : Michael Gould et al. |

It is certified that error appears in the above-identified patent and that said Letters Patent is hereby corrected as shown below:

Column 6, line 34 "(f–4)" to -- (f=4) --.
Column 8, line 2 "functionality=2 include," to -- functionality = 2 include, --.
Column 8, line 16 "functionality=6 include," to -- functionality = 6 include, --.
Column 9, line 19 "silica power is incorporated" to -- silica powder is incorporated --.
Column 9, last line "values OB to 5B; OB being a total failure" to -- values 0B to 5B; 0B being a total failure --.
Column 14, line 20, CLAIM 3 "according to claim 1, the" to -- according to claim 1, wherein the --.
Claim 14, line 56, CLAIM 10 "according to claim 6, the" to -- according to claim 6, wherein the --.
Column 15, line 5, CLAIM 13 "metallic monomer" to -- metallic monomer; --.
Column 16, line 5, CLAIM 16 "metallic monomer" to -- metallic monomer; --.

Signed and Sealed this

Sixth Day of October, 2009

David J. Kappos
*Director of the United States Patent and Trademark Office*